United States Patent
Yeakley et al.

(10) Patent No.: US 10,097,075 B2
(45) Date of Patent: Oct. 9, 2018

(54) LINEAR ACTUATOR WITH COIL WINDING PORTIONS HAVING OPPOSING CURRENT FLOW DIRECTIONS

(71) Applicant: Oracle International Corporation, Redwood City, CA (US)

(72) Inventors: Darryl Wayne Yeakley, Erie, CO (US); Frank A. Goodknight, Niwot, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 15/968,973

(22) Filed: May 2, 2018

(65) Prior Publication Data

US 2018/0248462 A1    Aug. 30, 2018

Related U.S. Application Data

(62) Division of application No. 14/287,415, filed on May 27, 2014, now Pat. No. 9,985,511.

(51) Int. Cl.
    *H02K 41/035*  (2006.01)
    *G11B 5/55*    (2006.01)
    *G11B 5/584*   (2006.01)

(52) U.S. Cl.
    CPC ....... *H02K 41/0356* (2013.01); *G11B 5/5504* (2013.01); *G11B 5/584* (2013.01); *H02K 2201/18* (2013.01)

(58) Field of Classification Search
    None
    See application file for complete search history.

(56) References Cited

U.S. PATENT DOCUMENTS

| | | |
|---|---|---|
| 5,434,549 A | 7/1995 | Hirabayashi |
| 5,440,183 A | 8/1995 | Denne |
| 6,037,739 A | 3/2000 | Hartramph |
| 7,538,980 B2 | 5/2009 | Harper |
| 8,254,045 B1 | 8/2012 | Benner, Jr. |
| 8,415,838 B1 | 4/2013 | Eghbal |
| 8,422,173 B2 | 4/2013 | Yeakley |
| 2008/0204174 A1* | 8/2008 | Ito et al. ........... H01F 7/066 335/222 |

* cited by examiner

*Primary Examiner* — Craig A. Renner
(74) *Attorney, Agent, or Firm* — Marsh Fischmann & Breyfogle LLP; Jonathon A. Szumny

(57) ABSTRACT

A linear actuator for linearly positioning a recording head in a data storage mechanism. The disclosed linear actuator includes an electrically conductive coil having first and second parts that are both wound in the same rotary direction about an axis, and a magnet spaced from the electrically conductive coil by an air gap. Transmission of an electric current through the first part of the electrically conductive coil in a first current flow direction about the axis and through the second part of the electrically conductive coil in an opposite second current flow direction about the axis induces linear movement of one of the electrically conductive coil and magnet relative to the other of the electrically conductive coil and magnet.

7 Claims, 7 Drawing Sheets

LINEAR ACTUATOR WITH COIL WINDING PORTIONS HAVING OPPOSING CURRENT FLOW DIRECTIONS

CROSS REFERENCE TO RELATED APPLICATIONS

This application is a divisional of U.S. application Ser. No. 14/287,415, entitled "LINEAR ACTUATOR WITH COIL WINDING PORTIONS HAVING OPPOSING CURRENT FLOW DIRECTIONS," and filed on May 27, 2014, the entire contents of which are incorporated herein as if set forth in full.

BACKGROUND

1. Field of the Invention

The present invention generally relates to data storage devices such as tape and disk drives and, more particularly, to linear actuators or voice coil actuators that are used to position tape heads relative to recording media in tape and disk drives.

2. Relevant Background

Tape drives have been widely employed in industry for over thirty years due to their ability to store large amounts of data on a relatively small and inexpensive removable format. Typically, a removable cartridge holding a reel or spool of storage tape is initially loaded into a tape drive. After coupling the storage tape on the cartridge reel to a take-up reel of the tape drive (e.g., via respective leaders), the tape is unwound from the cartridge supply reel, moved past one or more tape head assemblies (e.g., each having one or more tape heads with one or more read/write/servo elements/transducers in the case of magnetic tape) or optical pickup units (OPUs)(e.g., in the case of optical tape) for reading and/or writing of data, and wound onto the take-up reel via a drive motor. Next, the tape is unwound from the take-up reel, moved past the tape heads or OPUs, and wound onto the cartridge. The storage tape is uncoupled from the take-up reel prior to removing the cartridge from the tape drive.

A head assembly of a tape or disk drive typically includes a number of positioning subassemblies that allow a servo control system of the drive to accurately position the one or more heads relative to the recording media (e.g., to magnetic tape or disks) in a number of different manners. For instance, one positioning subassembly may include a coarse linear motor and corresponding travel carriage that is configured to linearly move the one or more tape heads in a lateral (e.g. perpendicular) direction relative to the direction of motion of the media. Another positioning subassembly of a tape or disk drive may include a rotary actuator that is configured to angularly position the one or more tape heads relative to the recording media (and the coarse travel carriage) about an axis that is perpendicular to the recording media (e.g., to the magnetic tape) as well as to the direction or path of motion of the recording media. The angular head motion allows the servo readers and/or the read/write elements on the head to be aligned correctly to the media during track following and/or during read/write operations. For instance, the rotary actuator may be attached to a read/write head by means of a carriage (e.g., the fine travel carriage) or other supporting structure.

Another positioning subassembly may include a linear (e.g., voice coil) actuator and corresponding travel carriage that is configured to linearly move the one or more tape heads relative to the coarse travel carriage and in a lateral direction relative to the direction of motion of the media (e.g., along an axis that is perpendicular to the direction of motion of the media) over a finer range of motion than that of the coarse travel carriage. Conventional linear actuators often include a linearly movable, electrically conductive coil having a plurality of windings that are disposed relative to a pole of a stationary magnet. Upon energizing the coil with an analog control signal (e.g., a DC bi-directional control signal), the head may be linearly moved (e.g., via magnetic flux paths between the coil and the magnet) to position the head relative to the recording media.

The coil of many voice coil actuators has significant mass in relation to that of the head assembly. As the mass of the coil is often broadly distributed about the actuation axis of the voice coil actuator, movement of the coil can result in out-of-plane resonant vibrations leading to instability, bandwidth reductions, and negative effects on tape head performance. Furthermore, the flexible printed circuit (FPC) that energizes the moving coil adds mass to the coil that is asymmetrical relative to the actuation axis and thus can result in out-of-plane resonances. Still further, FPCs are subject to fatigue failure caused by repeated cycling of the linear actuator.

SUMMARY

Disclosed herein is a linear actuator for linearly positioning a recording head in a data storage mechanism that has a mass distribution narrower than that of conventional linear or voice coil actuators. The disclosed linear actuator includes an electrically conductive coil having first and second parts that are both wound in the same rotary direction about an axis (e.g., either both clockwise or both counterclockwise). For instance, the first and second coil parts may be fixed to (e.g., or otherwise be non-movable relative to) an inner surface of a housing and axially aligned along the axis. Furthermore, a magnet is spaced from the electrically conductive coil by an air gap within the housing and linearly movable along the axis in first and second opposite directions. For example, the magnet may be in the form of a dual pole magnet assembly that includes a permanent magnet, a first pole piece on a first axial end of the magnet, and a second pole piece on a second axial end of the magnet. Transmission of an electric current through the first part of the electrically conductive coil in a first current flow direction about the axis and through the second part of the electrically conductive coil in an opposite second current flow direction about the axis induces linear movement of the magnet relative to the electrically conductive coil. For instance, any appropriate carriage or guide supporting the recording head may be rigidly (e.g., non-movably) secured to or relative to the magnet so that linear movement of the magnet induces corresponding linear movement of the recording head in one of first and second opposite directions.

Winding the first and second parts of the electrically conductive coil in the same rotary direction about the axis can advantageously simplify the manufacturing process as compared to linear actuators having oppositely wound coil portions. Furthermore, the likelihood of detrimental out-of-plane resonances is reduced in relation to conventional linear actuators because the moveable dual pole magnet has a narrower mass distribution that is more closely aligned to the actuation axis. Furthermore, disclosed linear actuator need not require a FPC because the electrically conductive coil may be a stationary coil fixed to a housing or other supporting structure for the linear actuator. Still further, the permanent magnet of the dual pole magnet assembly does not require an electrical connection to a circuit, such as via an FPC. Elimination of an FPC also eliminates fatigue failures caused by repeated cycling of the linear actuator as well as any adverse effects on the symmetry of the dual pole magnet assembly caused by an FPC.

In one aspect, a linear actuator includes a housing having a body with an opening and an inner surface surrounding the opening, an electrically conductive coil disposed within the opening and having first and second parts that are both wound in the same rotary direction about an axis, and a magnet disposed within the opening and having first and second poles on first and second axial ends of the magnet. One of the electrically conductive coil and magnet is non-movable relative to the inner surface of the body and the other of the electrically conductive coil and magnet is linearly movable relative to the inner surface of the body and the one of the electrically conductive coil and magnet along the axis. Transmission of an electric current through the first part of the electrically conductive coil in a first current flow direction about the axis and simultaneously through the second part of the electrically conductive coil in an opposite second current flow direction about the axis induces the linear movement of the other of the electrically conductive coil and magnet.

In one embodiment, the first part of the electrically conductive coil may be electrically connected to the second part of the electrically conductive coil (e.g., via an electrically conductive wire). In another embodiment, each of the first and second parts of the electrically conductive coil may include first and second opposite ends, where the first end of the first part of the electrically conductive coil is electrically connected to the first end of the second part of the electrically conductive coil. In one variation, the second end of the first part of the electrically conductive coil may include a first lead wire and the second end of the second part of the electrically conductive coil may include a second lead wire, where the transmitted electric current travels in a first direction through the first lead wire travels in a second direction through the second lead wire that is opposite to the first direction.

In one arrangement, the first part of the electrically conductive coil attracts the first pole of the magnet and the second part of the electrically conductive coil repels the second pole of the magnet when the electric current is transmitted through the first part of the electrically conductive coil in the first current flow direction and through the second part of the electrically conductive coil in the second current flow direction to move the other of the electrically conductive coil and magnet in a first linear direction along the axis. Additionally and/or alternatively, the first part of the electrically conductive coil may repel the first pole of the magnet and the second part of the electrically conductive coil may attract the second pole of the magnet when the electric current is transmitted through the first part of the electrically conductive coil in the second current flow direction and through the second part of the electrically conductive coil in the first current flow direction to move the other of the electrically conductive coil and magnet in a second linear direction along the axis that is opposite to the first linear direction.

In another aspect, a method of operating a linear actuator includes supplying a current through a first part of an electrically conductive coil that is wound in a rotary direction about an axis in a first current flow direction about the axis and through a second part of the electrically conductive coil that is wound in the rotary direction about the axis in a second current flow direction about the axis, and moving, in response to the supplying, a magnet along the axis.

In a further aspect, a head positioning assembly for a data storage drive includes at least one recording head configured to read data from and/or write data to storage media, a travel carriage non-movably (e.g., rigidly) attached to the at least one recording head, a magnet non-movably (e.g., rigidly) attached to the travel carriage, and an electrically conductive coil disposed about the magnet and that includes a first part that is wound in a rotary direction about a first axis and a second part that is wound in the rotary direction about the first axis. Transmission of an electric current through the first part of the electrically conductive coil in a first current flow direction about the first axis and simultaneously through the second part of the electrically conductive coil in a second current flow direction about the first axis induces linear movement of the travel carriage along the first axis and corresponding linear movement of the at least one recording head along a second axis that is parallel to the first axis.

Any of the embodiments, arrangements, or the like discussed herein may be used (either alone or in combination with other embodiments, arrangements, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

BRIEF DESCRIPTION OF THE DRAWINGS

FIG. 3 is a partial cross-sectional view of the HPA of FIG. 2a.

DETAILED DESCRIPTION

Disclosed herein is a linear actuator including an electrically conductive coil having first and second parts that are both wound in the same rotary direction about an axis (e.g., either both clockwise or both counterclockwise) and a magnet disposed relative to the electrically conductive coil within a housing. When the electrically conductive coil is fixed to the inner surface of the housing, the magnet is movable along the axis relative to the electrically conductive coil and the housing. For instance, transmission of an electric current through the first part of the electrically conductive coil in a first current flow direction about the axis and through the second part of the electrically conductive coil in an opposite second current flow direction about the axis induces linear movement of the magnet relative to the electrically conductive coil. Any appropriate carriage or guide supporting the recording head may be rigidly (e.g., non-movably) secured to or relative to the magnet so that linear movement of the magnet induces corresponding linear movement of the recording head.

Figure 1:
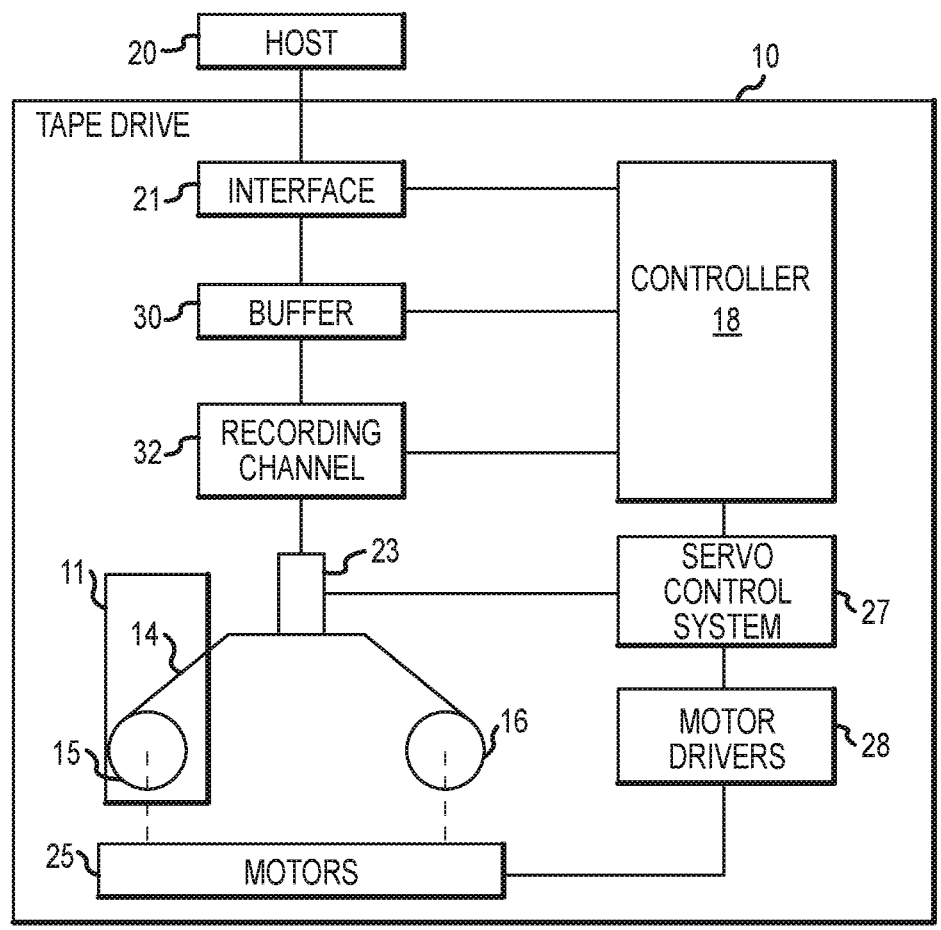
FIG. 1 is a schematic diagram of a tape drive that may incorporate a linear actuator for linearly positioning a tape head relative to recording media as disclosed herein.

Before discussing the linear actuator presented herein in more detail, it may be useful to disclose one representative environment in which the disclosed linear actuator may be implemented (while it is to be understood, however, that numerous other such contexts are envisioned and encompassed herein). In this regard, FIG. 1 presents a schematic view of an exemplary tape drive 10 within which the disclosed linear actuator may be implemented to linearly adjust one or more recording heads relative to magnetic tape media (e.g., in a lateral or perpendicular direction relative to the media). For instance, the tape drive 10 may receive a magnetic tape cartridge 11 that includes a length of magnetic tape 14 (e.g., magnetic tape pack, magnetic tape media) wound on at least one reel 15. One or more controllers 18 of a recording system may be included for operating the tape drive 10 in accordance with commands received from a host system 20 received at an interface 21. The tape drive 10 may be coupled to the host system 20 in a number of manners such as directly, through a library, or over a network (e.g., via Small Computer Systems Interface (SCSI), Fibre Channel Interface, and the like). The tape drive 10 may be a standalone unit or form part of a tape library or other subsystem.

The magnetic tape cartridge 11 may be inserted into the tape drive 10 and loaded by the tape drive 10 so that the tape 14 winds around a reel 16 of the tape drive 10 (e.g., in addition to one or more rollers or the like) and so that at least one head positioning assembly (HPA) 23 (e.g., tape head assembly) of the recording system reads and/or writes information with respect to the magnetic tape 14 as the tape 14 is moved longitudinally in first/forward and/or second/reverse opposed directions by one or more motors 25 past the HPA 23. For instance, the HPA 23 may include one or more heads, where each head includes a series of servo, read, and/or write elements (e.g., transducers). The recording system may include a servo control or tracking system 27 to electronically switch from one head to another head, to seek and move the heads laterally relative to the tape 14, to position the heads at a desired location over the tape 14 and/or one or more tracks of the tape 14, to follow one or more desired tracks, and/or the like. The various components of the tape drive 10 may be incorporated or otherwise embodied within any appropriate housing (not shown). The servo control system 27 may also control the operation of the motors 25 through motor drivers 28 in response to instructions by the one or more controllers 18, where the controllers 18 may provide the data flow and formatting of data to be read from and written to the magnetic tape 14 (e.g., via employing a buffer 30 and a recording channel 32).

Figure 2A:
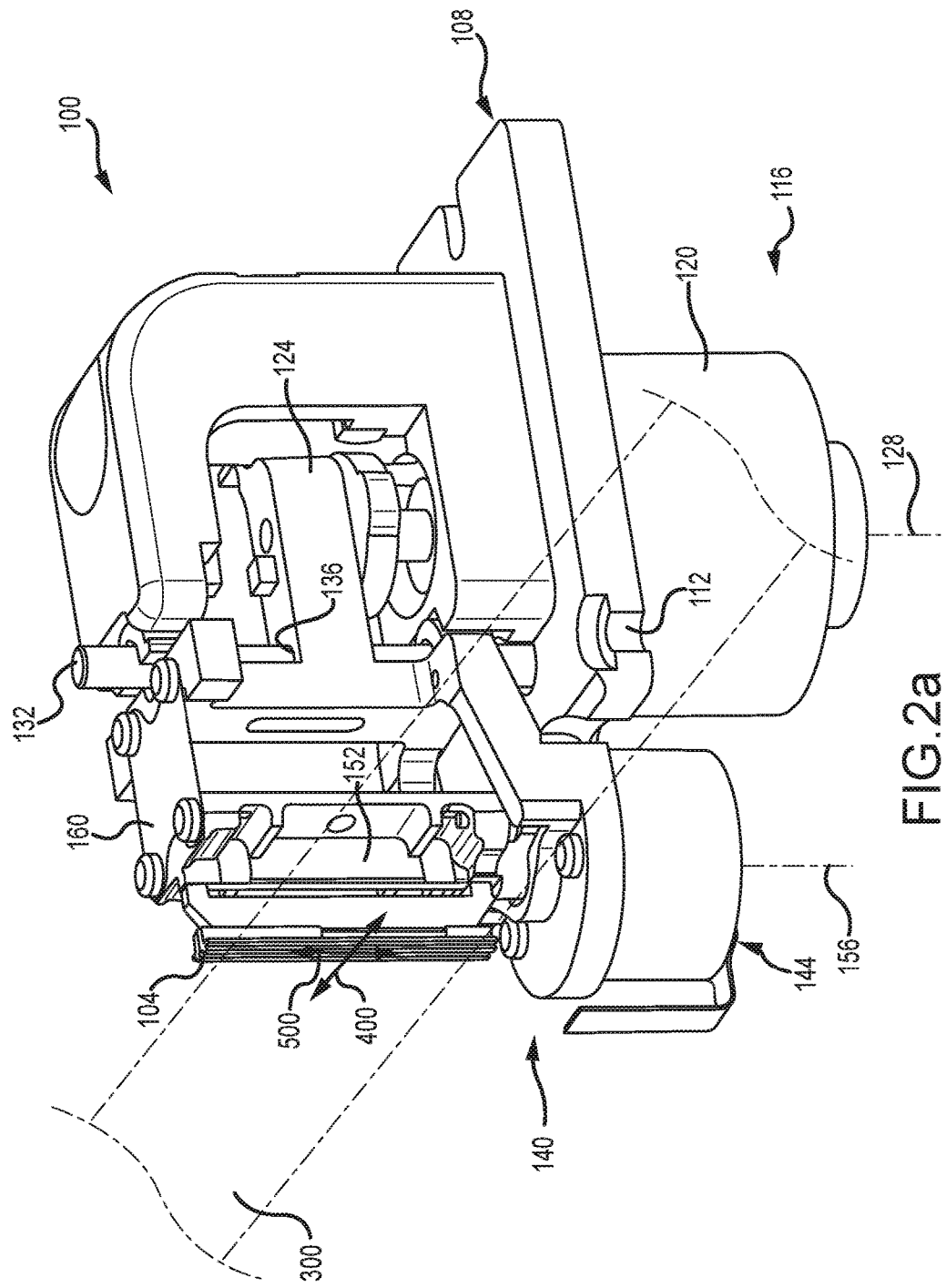
FIG. 2a is a perspective view of a head positioning assembly (HPA) that incorporates a linear actuator for linearly positioning a tape head relative to recording media according to an embodiment.
Figure 3:
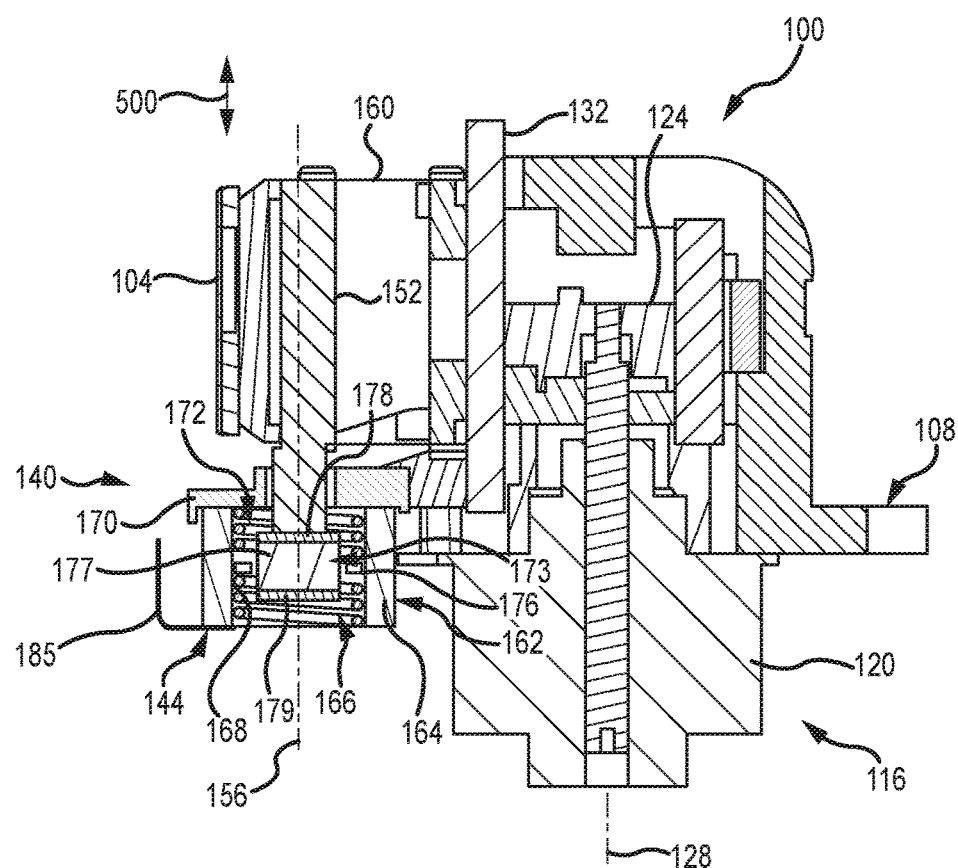
Figure 4:
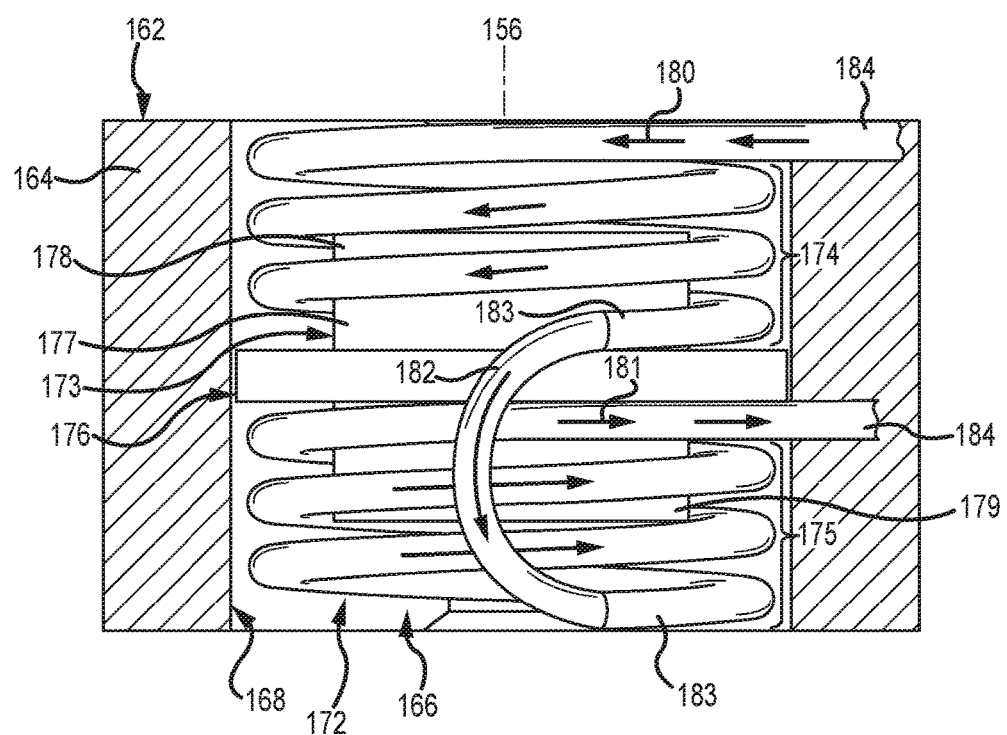
FIG. 4 is a partial cross-sectional view of a linear actuator according to an embodiment.
Figure 5:
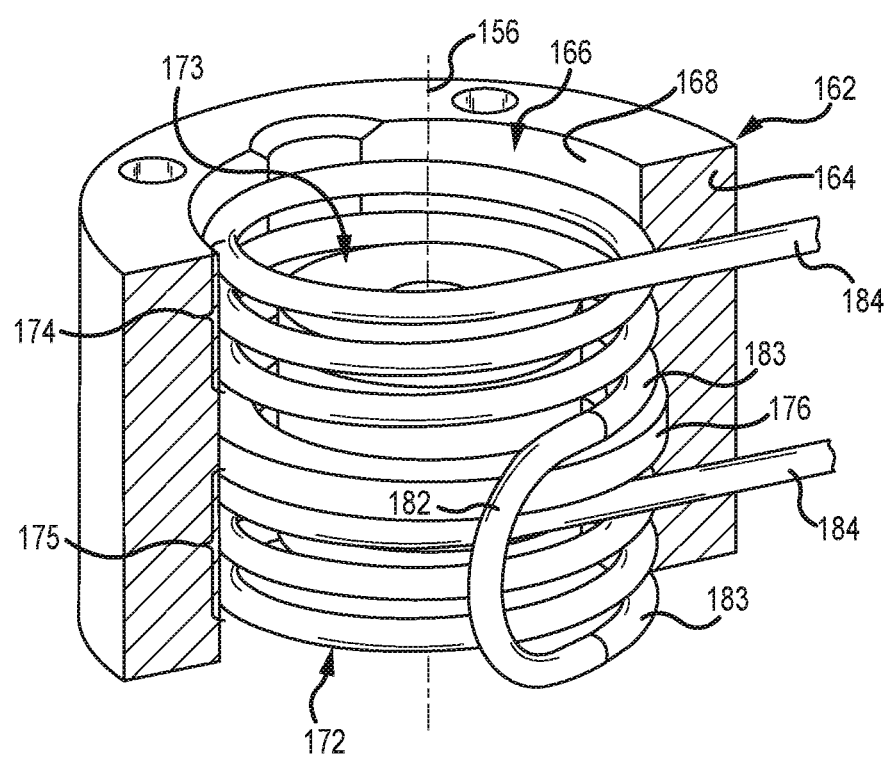
FIG. 5 is a partial cross-sectional perspective view of the linear actuator of FIG. 4.

Turning now to FIGS. 2a and 3, one embodiment of an HPA 100 (e.g., which may be implemented as the HPA 23 of FIG. 1) is illustrated that incorporates a linear actuator 144 for linearly adjusting at least one recording head 104 in a lateral direction along a path 500 (e.g., axis) that is perpendicular to a path 400 of movement of a length of magnetic tape 300 in front of the recording head 104. While not shown, the recording head 104 may include a plurality of read, write, and/or servo elements (e.g., transducers) configured to appropriately read data from and/or write data to the length of magnetic tape 300 as it moves in one of first and second opposite directions along the path 400 in front of the recording head 104. The HPA 100 may generally include a housing 108 of any appropriate size and shape to which one or more components of the HPA 100 may be secured and which may be used to secure the HPA 100 to a data storage device (e.g., tape drive 10) and/or the like. As just one example, the housing 108 may include one or more apertures 112 therethrough into which any appropriate fasteners (e.g., bolts, not shown) may be inserted to secure the housing 108 (and thus the HPA 100) to a data storage device and/or the like.

The HPA 100 may include a number of positioning subsystems operable to move or otherwise manipulate the recording head 104 into any appropriate position(s), such as to allow the read/write/servo elements to more accurately follow data and/or servo tracks or the like on the magnetic tape 300. One positioning subsystem may be a coarse travel subsystem 116 that is configured to linearly move the recording head 104 in the first and second opposing directions along the path 500 over a range of travel (e.g., by the servo control system 27 of FIG. 1). In one embodiment, the coarse travel subsystem 116 may include a coarse travel actuator 120 (e.g., motor) that is operable to move a coarse travel carriage 124 in one of first and second opposing linear directions along an axis 128 that is substantially parallel to the path 500. For instance, the coarse travel carriage 124 may be configured to ride along a guiding shaft 132 (e.g., via inserting the guiding shaft 132 through an aperture 136 of the carriage) to guide linear movement of the coarse travel carriage 124 upon activation of the coarse travel actuator 120.

Another positioning subsystem of the HPA 100 may be a fine travel subsystem 140 that is configured to linearly position the recording head 104 along the path 500 over a range of travel that is less (e.g., finer) than that of the coarse travel subsystem 116. As will be discussed in more detail below, the fine travel subsystem 140 includes the linear actuator 144, where the linear actuator 144 includes a housing 162 that is rigidly (e.g., non-movably) secured to or relative to the coarse travel carriage 124 so that linear movement of the coarse travel carriage 124 induces corresponding linear movement of the fine travel subsystem 140. In this regard, the coarse travel subsystem 116 may be utilized by the servo control system 27 to generally move the recording head 104 into a desired area over the tape 300 while the fine travel subsystem 140 may be utilized by the servo control system 27 to "fine tune" the position of the recording head 104.

Specifically, the linear actuator 144 is configured to linearly move a fine travel carriage 152 to which the recording head 104 is fixedly secured (e.g., or otherwise non-movable relative to) along an axis 156 that is parallel to the path 500. Thus, linear movement of the fine travel carriage 152 along the axis 156 induces corresponding movement of the recording head 104 along path 500 (e.g., to allow the recording head 104 to dynamically follow tracks on the tape 300). One or more fine guiding flexures 160 (e.g., planar leaf springs constructed of sheet steel or the like)

secure the fine travel carriage 152 to the coarse travel carriage 124 to support the recording head 104 and flex in response to movement induced by the linear actuator 144.

With reference now to FIGS. 2a and 3-5, the linear actuator 144 broadly includes a housing 162 including a body 164 constructed of any appropriate material (e.g., steel or other material configured to provide a magnetic flux return path) and of any appropriate shape (e.g., cylindrical). As shown, the body 164 includes an aperture or opening 166 therein as well as an inner surface 168 surrounding the opening 166. In one arrangement, the housing 162 may also include a covering or cap 170 that is configured to partially cover or conceal an end of the opening 166. While not shown, an opposite end of the opening 166 may also include any appropriate covering, cap, etc. configured to partially or fully close or cover the opposite end.

An electrically conductive coil 172 (e.g., constructed of magnet wire) having a plurality of windings may be disposed within the opening 166 and non-movably secured relative to the housing 162. For instance, the electrically conductive coil 172 may be fixed or otherwise secured to the inner surface 168 of the body 164 in any appropriate manner. Furthermore, the electrically conductive coil 172 includes a first (e.g., upper) portion or part 174 and a second (e.g. lower) portion or part 175 that are wound in the same rotary direction about the axis 156, axially aligned along the axis 156, and separated or spaced by any appropriate coil spacer 176 (e.g., in the shape of a disk or washer and constructed of plastic or other non-electrically and non-magnetically conductive material).

Furthermore, a dual pole magnet assembly 173 may also be disposed within the opening 166 and linearly movable along axis 156 relative to the housing 162 and the electrically conductive coil 172. For instance, the dual pole magnet assembly 173 may include at least one magnet 177 (e.g., permanent magnet) having opposite first and second (e.g., top and bottom) poles 178, 179 on first and second axial or opposite ends thereof. In one arrangement, the first and second poles 178, 179 may include separate pole pieces (e.g., any appropriate material of high magnetic permeability) for purposes of extending the poles and/or concentrating or directing the magnetic field or flux. In another arrangement, the dual pole magnet assembly 173 may include additional magnets (e.g., bucking magnets) to increase the magnetic flux density in the coil. The dual pole magnet assembly 173 may be disposed within the electrically conductive coil 172 and centered within the electrically conductive coil 172 in a neutral position of the dual pole magnetic assembly (e.g., so that the first and second poles 178, 179 are at least partially disposed between the first and second parts 174, 175). Furthermore, the dual pole magnetic assembly 173 may be spaced from the electrically conductive coil 172 by an air gap (not labeled).

Additionally, the fine travel carriage 152 may be rigidly attached to or at least non-movable relative to the dual pole magnet assembly 173. For instance, a threaded bolt or the like (not shown) may be passed through a central aperture (not shown) of the dual pole magnet assembly 173 and threaded into an end of the fine travel carriage 152. In any event, this arrangement allows linear movement of the dual pole magnet assembly 173 in one of first and second opposite directions along axis 156 to induce corresponding linear movement of the recording head 104 (via the fine travel carriage 152) in the one of the first and second opposite directions along path 500.

As shown, the windings of the first part 174 and the windings of the second part 175 are both wound in the same rotary or winding direction about the axis 156 (e.g., either both clockwise or both counterclockwise). Winding the first and second parts 174, 175 in the same rotary direction about the axis 156 simplifies the manufacturing process. However, the first and second parts 174, 175 are electrically interconnected in a manner that allows a transmitted electric (e.g., DC) current (e.g., controlled by servo control system 27 of FIG. 1) to simultaneously pass in respective first and second opposite current flow directions 180, 181 about the axis 156 (e.g., one being clockwise about the axis 156 and the other being counterclockwise about the axis 156) through the first and second parts 174, 175. Accordingly, the first part 174 may be configured to attract the first pole 178 and the second part 175 may be configured to repel the second pole 179 to move the dual pole magnet assembly 173 in one of first and second opposite directions along axis 156 which induces corresponding linear movement of the recording head 104 (via the fine travel carriage 152) in the one of the first and second opposite directions along path 500.

Conversely, transmission of the current through the first part 174 in the second current flow direction 181 and simultaneously through the second part 175 in the first current flow direction 180 causes the first part 174 to repel the first pole 178 and the second part 175 to attract the second pole 179 to move the dual pole magnet assembly 173 in the other of the first and second opposite directions along axis 156 and induce corresponding linear movement of the recording head 104 (via the fine travel carriage 152) in the other of the first and second opposite directions along path 500. In one arrangement, magnetic flux paths resulting from the permanent magnet may flow from one of the first and second poles 178, 179 to the other of the first and second poles 178, 179, across the air gap between the dual pole magnet assembly 173 and the electrically conductive coil 172, through one of the first and second parts 174, 175 of the electrically conductive coil 172, through the body 164 of the housing 162, through the other of the first and second parts 174, 175, across the air gap, and through the other of the first and second poles 178, 179 before beginning the cycle again.

In one arrangement, the first part 174 of the electrically conductive coil 172 may be electrically connected to the second part 175 of the electrically conductive coil 172 by an electrically conductive wire 182 or the like. For instance, the first and second parts 174, 175 may be identical but separate coils, each having opposite first and second ends 183, 184, where the electrically conductive wire 182 electrically connects the first end 183 of the first part 174 to the first end 183 of the second part 175. Alternatively, the first and second parts 174, 175 may initially be part of the same single coil, whereby the single coil may be appropriately manipulated (e.g., twisted) to form the first and second spaced but electrically connected parts 174, 175. In any case, opposite ends (e.g., second ends 184) of the first and second parts 174, 175 may be respectively electrically connected to any appropriate DC power source (e.g., via electrical connector(s) 185) to supply a DC current through the electrically conductive coil 172.

As the first end 183 of the first part 174 is electrically connected to the first end 183 of the second part 175, the supplied DC current results in the opposite current flow directions 180, 181 through the first and second parts 174, 175, respectively (or vice versa) and thus linear movement of the dual pole magnet assembly 173 along the axis 156 (and thus corresponding linear movement of the recording head 104 along the path 500). In one arrangement, the second ends 184 of the first and second parts 174, 175 may each be in the form of or include respective lead wires or the like for connection to the power source. In the event the first and second ends 183, 184 were reversed in FIGS. 4-5, the second ends 184 of the first and second parts 174, 175 would be electrically connected to each other and the first ends 183 of the first and second parts 174, 175 would be electrically connected to the power source. In this regard, it is to be noted that either of the first and second ends of the first and second parts 174, 175 could be labeled as the "first end" leaving the other of the first and second ends as the "second end."

Figure 6:
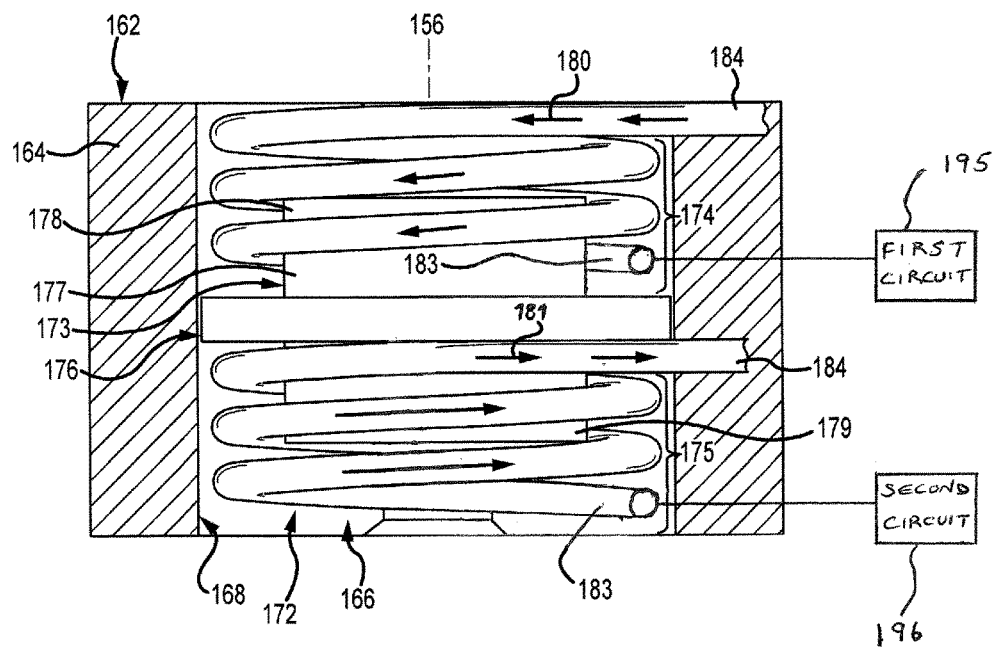
FIG. 6 is a partial cross-sectional view of a linear actuator according to another embodiment.

It will be readily appreciated that many additions and/or deviations may be made from the specific embodiments disclosed in the specification without departing from the spirit and scope of the invention. For instance, while the first and second parts 174, 175 of the electrically conductive coil 172 have been discussed as being electrically connected (e.g., via electrically conductive wire 182) so that DC power supplied via second ends 184 results in the first and second opposite current flow paths 180, 181, the disclosed linear actuator 144 is not so limited. In one arrangement, for instance, and as shown in the embodiment of the linear actuator of FIG. 6, the first and second parts 174, 175 may not be electrically connected and may be powered by different respective first and second drivers or circuits 195, 196 to drive current through the first and second parts 174, 175 in the first and second opposite current flow paths 180, 181.

As another example, one embodiment envisions that the dual pole magnet assembly 173 may be stationary and the electrically conductive coil 172 may be linearly movable in first and second opposite directions along the axis 156 in response to a current applied to the electrically conductive coil 172. For instance, the dual pole magnet assembly 173 may be appropriately fixed to (e.g., or otherwise be non-movable relative to) the housing 162 while the electrically conductive coil 172 may be appropriately rigidly fixed (e.g., or otherwise be non-movable relative to) the fine travel carriage 152.

Figure 2B:
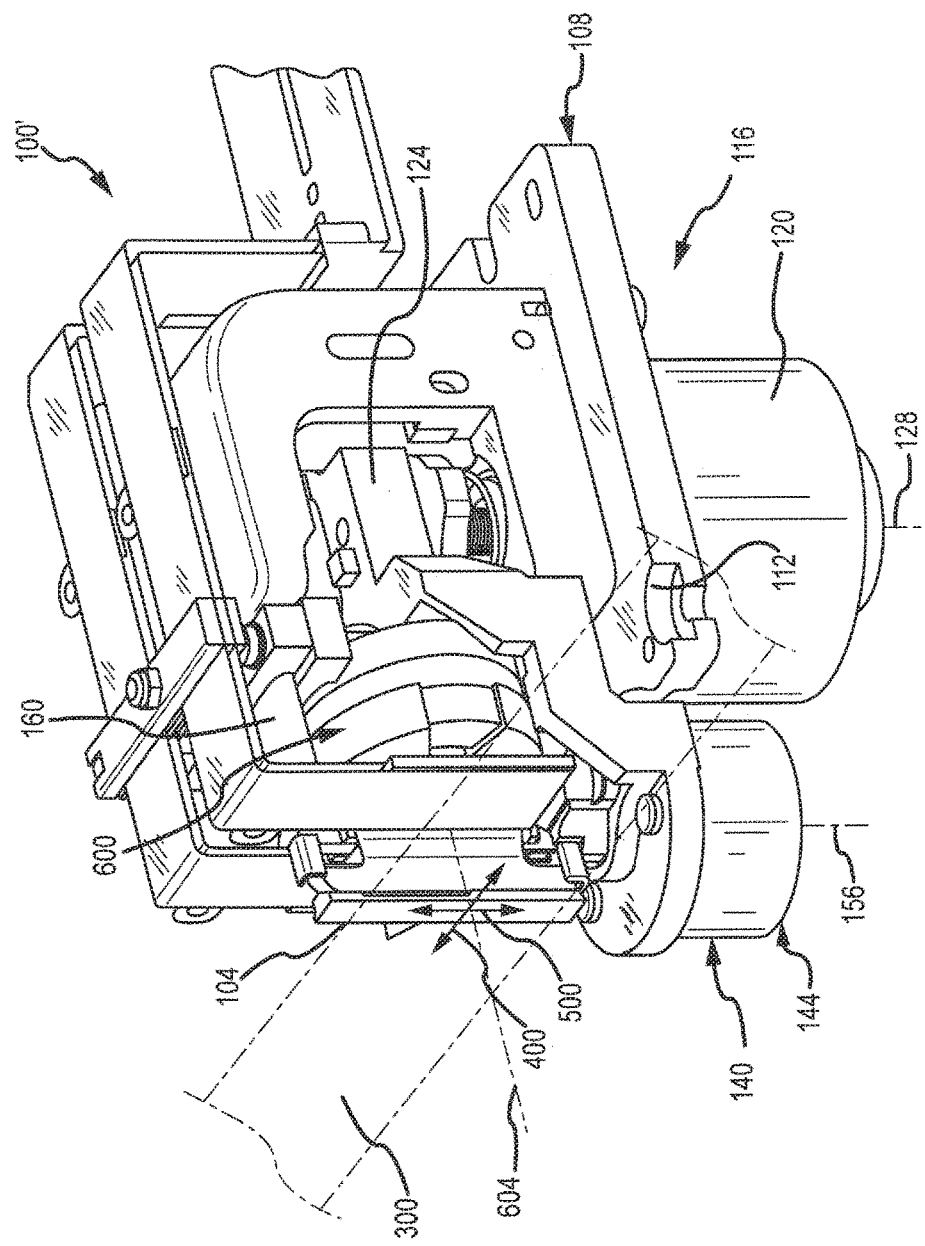
FIG. 2b is a perspective view of a head positioning assembly (HPA) that incorporates a linear actuator for linearly positioning a tape head relative to recording media and a rotary actuator for rotationally positioning the tape head relative to recording media according to an embodiment.

As a further example, FIG. 2b illustrates another HPA 100' within which linear actuator 144 may be incorporated. Once difference between the HPA 100 of FIG. 2a and the HPA 100' in FIG. 2b is the inclusion of a rotary actuator 600 that is configured to angularly or rotatably adjust the recording head 104 about an axis 604 that is perpendicular to the direction 400 of motion of the tape 300 as well as to the linear path 500. For instance, the HPA 100' may be that described in U.S. Ser. No. 14/068,368 which has been incorporated herein in its entirety as if set forth in full. Furthermore, it is to be understood that the disclosed linear actuator may be used in other contexts (i.e., other than tape drive or storage mechanism contexts) in which linear control of a component over a fine range is desired (e.g., medical devices).

Embodiments disclosed herein can be implemented as one or more computer program products, i.e., one or more modules of computer program instructions encoded on a computer-readable medium for execution by, or to control the operation of, data processing apparatus. For example, the logic or software of the servo control system 27 that manipulates the linear actuator 144 may be provided in such computer-readable medium of the tape drive 10 (e.g., on a circuit board) and executed by a corresponding processor or processing engine (not shown). The computer-readable medium can be a machine-readable storage device, a machine-readable storage substrate, a non-volatile memory device, a composition of matter affecting a machine-readable propagated signal, or a combination of one or more of them. In this regard, the tape drive 10 may encompass one or more apparatuses, devices, and machines for processing data, including by way of example a programmable processor, a computer, or multiple processors or computers. In addition to hardware, the tape drive 10 may include code that creates an execution environment for the computer program in question, e.g., code that constitutes processor firmware, a protocol stack, a database management system, an operating system, or a combination of one or more of them.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments or arrangements can also be implemented in combination in a single embodiment or arrangement. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems may be integrated together in a single hardware product or packaged into multiple hardware products.

The above described embodiments including the preferred embodiment and the best mode of the invention known to the inventor at the time of filing are given by illustrative examples only.

We claim:

1. A method of operating a linear actuator, comprising:
   supplying a first current through a first part of an electrically conductive coil that is wound in a rotary direction about an axis in a first current flow direction about the axis and through a second part of the electrically conductive coil that is wound in the rotary direction about the axis in a second current flow direction about the axis, wherein the first and second parts are both wound in a same direction along the axis, and wherein the first current flow direction is opposite to the second current flow direction; and
   moving, in response to supplying the first current, a magnet in a first direction along the axis, wherein the magnet includes a first pole on a first axial end of the magnet and a second pole on a second axial end of the magnet, wherein moving the magnet in the first direction includes:
      attracting, with the first part of the electrically conductive coil, the first pole of the magnet; and
      repelling, with the second part of the electrically conductive coil, the second pole of the magnet.

2. The method of claim 1, further including:
generating, with the magnet, magnetic flux paths between the electrically conductive coil and the magnet.

3. The method of claim 2, wherein the magnetic flux paths pass through a housing within which the electrically conductive coil and magnet are disposed.

4. The method of claim 1, wherein the method further includes:
supplying a second current through the first part of the electrically conductive coil in the second current flow direction about the axis and through the second part of the electrically conductive coil in the first current flow direction about the axis; and
moving, in response to supplying the second current, the magnet in a second direction along the axis that is opposite to the first direction along the axis.

5. The method of claim 4, wherein moving the magnet in the second direction includes:
repelling, with the first part of the electrically conductive coil, the first pole of the magnet; and
attracting, with the second part of the electrically conductive coil, the second pole of the magnet.

6. The method of claim 1, further including:
moving a recording head relative to a magnetic tape in conjunction with moving the magnet.

7. The method of claim 1, wherein supplying the first current includes:
using a first circuit to supply current through the first part in the first current flow direction; and
using a different second circuit to supply current through the second part in the second current flow direction.

* * * * *

UNITED STATES PATENT AND TRADEMARK OFFICE
CERTIFICATE OF CORRECTION

PATENT NO. : 10,097,075 B2
APPLICATION NO. : 15/968973
DATED : October 9, 2018
INVENTOR(S) : Yeakley et al.

Page 1 of 1

It is certified that error appears in the above-identified patent and that said Letters Patent is hereby corrected as shown below:

In the Specification

In Column 1, Line 35, delete "(OPUs)(e.g.," and insert -- (OPUs) (e.g., --, therefor.

Signed and Sealed this
Thirty-first Day of December, 2019

Andrei Iancu
*Director of the United States Patent and Trademark Office*